(12) United States Patent
Magpayo et al.

(10) Patent No.: US 10,326,896 B2
(45) Date of Patent: Jun. 18, 2019

(54) IMAGE PROCESSING APPARATUS

(71) Applicant: KYOCERA Document Solutions Inc., Osaka-shi, Osaka (JP)

(72) Inventors: Ruell Magpayo, Osaka (JP); Alvin Difuntorum, Cebu (PH)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/566,651

(22) PCT Filed: Dec. 28, 2015

(86) PCT No.: PCT/JP2015/086560
§ 371 (c)(1),
(2) Date: Oct. 13, 2017

(87) PCT Pub. No.: WO2016/170713
PCT Pub. Date: Oct. 27, 2016

(65) Prior Publication Data
US 2018/0091665 A1 Mar. 29, 2018

(30) Foreign Application Priority Data

Apr. 20, 2015 (JP) ................... 2015-085597

(51) Int. Cl.
*H04N 1/00* (2006.01)
*G06F 3/0488* (2013.01)
(Continued)

(52) U.S. Cl.
CPC ....... *H04N 1/00435* (2013.01); *G06F 3/0482* (2013.01); *G06F 3/0488* (2013.01);
(Continued)

(58) Field of Classification Search
CPC ................... H04N 1/00435; H04N 1/00421
See application file for complete search history.

(56) References Cited

U.S. PATENT DOCUMENTS

| 2008/0201665 A1 | 8/2008 | Shimada |
| 2009/0161959 A1* | 6/2009 | Markiewicz ........ G06F 3/04883 382/187 |

(Continued)

FOREIGN PATENT DOCUMENTS

JP   2008198138 A   8/2008

*Primary Examiner* — King Y Poon
*Assistant Examiner* — Michael Burleson
(74) *Attorney, Agent, or Firm* — Alleman Hall Creasman & Tuttle LLP

(57) ABSTRACT

An image processing apparatus includes a display panel, a storage medium, first and second display processing portions, and a function execution processing portion. A plurality of pieces of functional information organized in hierarchical layers are stored in the storage medium. The first display processing portion displays high-order commands in a first display frame, the high-order commands corresponding to the pieces of functional information that belong to a high-order layer. The second display processing portion, when a high-order command has been selected, displays low-order commands in a second display frame, the low-order commands corresponding to the pieces of functional information of a low-order layer that belongs to the high-order command. The function execution processing portion, when the high-order command has been selected and a low-order command has been selected, executes a function corresponding to a specific piece of functional information that is common to the selected commands.

5 Claims, 7 Drawing Sheets

(51) Int. Cl.
*G06F 3/0482* (2013.01)
*G06F 3/0484* (2013.01)

(52) U.S. Cl.
CPC ..... *G06F 3/04847* (2013.01); *H04N 1/00395* (2013.01); *H04N 1/00421* (2013.01); *H04N 1/00474* (2013.01); *H04N 2201/0094* (2013.01)

(56) References Cited

U.S. PATENT DOCUMENTS

| | | | |
|---|---|---|---|
| 2012/0087684 A1* | 4/2012 | Sasaki | G03G 15/5062 399/53 |
| 2012/0198026 A1* | 8/2012 | Roy | G06Q 30/0641 709/218 |
| 2013/0120295 A1* | 5/2013 | Kim | G06F 3/01 345/173 |

* cited by examiner

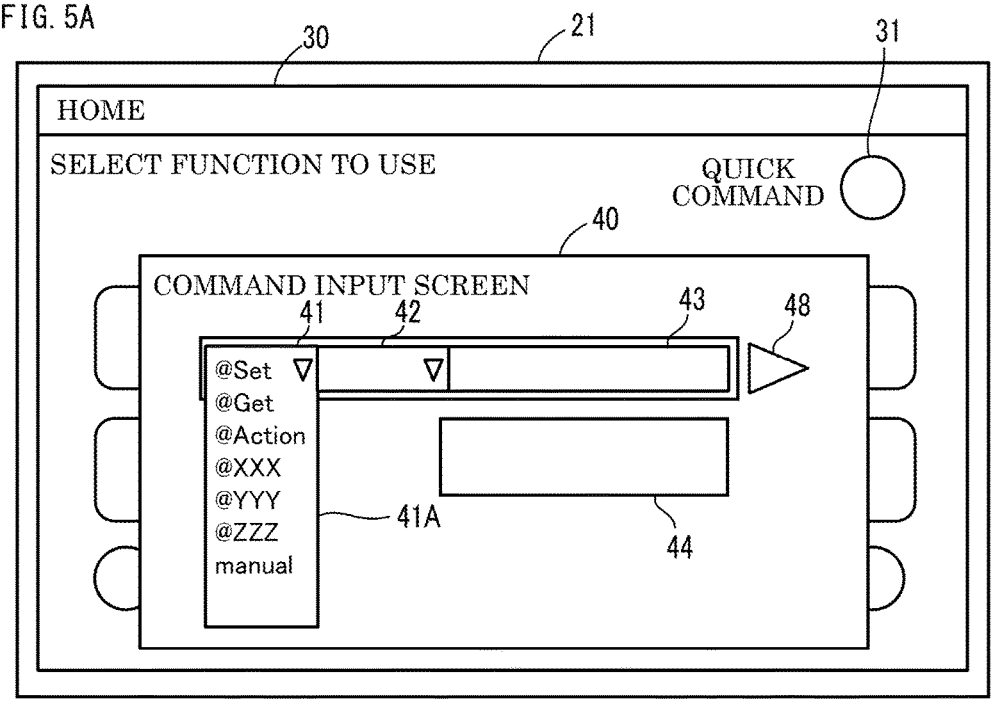
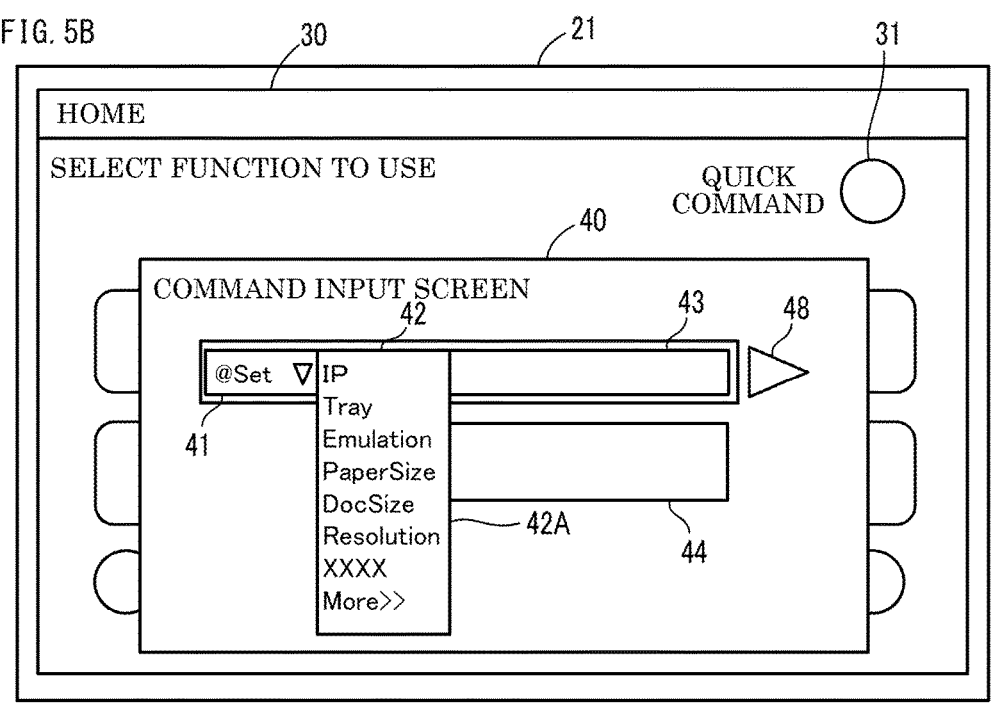

IMAGE PROCESSING APPARATUS

TECHNICAL FIELD

The present invention relates to an image processing apparatus such as an image forming apparatus or an image reading apparatus that can display functional information.

BACKGROUND ART

An image processing apparatus such as a printer that performs image processing based on image data, is provided with a plurality of functions regarding the image processing. The plurality of functions include, for example, a copy function, a data transmission function, and a facsimile function. In addition, the image processing apparatus is provided with a display panel. On the display panel, a setting screen is displayed, wherein the setting screen is used to input settings for the functions and execute the functions. The user operates a function key corresponding to a function to individually display a setting screen for the function, and inputs various types of setting instructions and execution instructions on the displayed setting screen.

In the image processing apparatus that has a lot of functions, a plurality of setting items and execution items are provided for each of the functions. As a result, there may be a case where the user cannot find a desired setting item or execution item quickly. There is known an electronic device that displays a list of short-cut functions assigned to a plurality of function keys so that a function registration or a setting change can be easily performed (see PTL 1).

CITATION LIST

Patent Literature

[PTL 1] Japanese Patent Application Publication No. 2008-198138

SUMMARY OF THE INVENTION

Problems to be Solved by the Invention

However, even when a list of short-cut functions is displayed on the display panel, it is not easy to find a desired setting item or execution item from the list. In recent years, image processing apparatuses called multifunction peripherals have come to have a lot of functions, and thus the number of setting items and execution items belonging to the functions has also increased. Accordingly, it is not easy for not only an inexperienced user but also an experienced user to reach a desired setting item or execution item.

The present invention has been made in view of such conventional circumstances, and it is an object of the present invention to provide an image processing apparatus in which functional information regarding a function provided in the image processing apparatus can be easily retrieved, and a function corresponding to the functional information can be executed.

Solution to the Problems

An image processing apparatus according to an aspect of the present invention includes a display panel, a storage medium, a first display processing portion, a second display processing portion, and a function execution processing portion. A plurality of pieces of functional information organized in hierarchical layers are stored in the storage medium. The first display processing portion displays, in a selectable manner, high-order commands in a first display frame assigned to the display panel, the high-order commands corresponding to a plurality of pieces of functional information that belong to a high-order layer. The second display processing portion, when a high-order command has been selected from the high-order commands in the first display frame, displays, in a selectable manner, low-order commands in a second display frame assigned to the display panel, the low-order commands corresponding to a plurality of pieces of functional information that are included in a low-order layer that belongs to the high-order command. The function execution processing portion, when the high-order command has been selected in the first display frame and a low-order command has been selected in the second display frame, executes a function corresponding to a specific piece of functional information that is common to the high-order command selected in the first display frame and the low-order command selected in the second display frame.

Advantageous Effects of the Invention

According to the present invention, functional information regarding a function provided in the image processing apparatus can be easily retrieved, and a function corresponding to the functional information can be executed.

BRIEF DESCRIPTION OF THE DRAWINGS

FIG. 5A is a screen diagram showing an example of the command input screen displayed on the display panel.

FIG. 5B is a screen diagram showing an example of the command input screen displayed on the display panel.

DESCRIPTION OF EMBODIMENTS

The following describes an embodiment of the present invention with reference to the accompanying drawings for the understanding of the invention. It should be noted that the following embodiment is an example of a specific embodiment of the present invention and should not limit the technical scope of the present invention.

[Outlined Configuration of Image Processing Apparatus 10]

Figure 1:
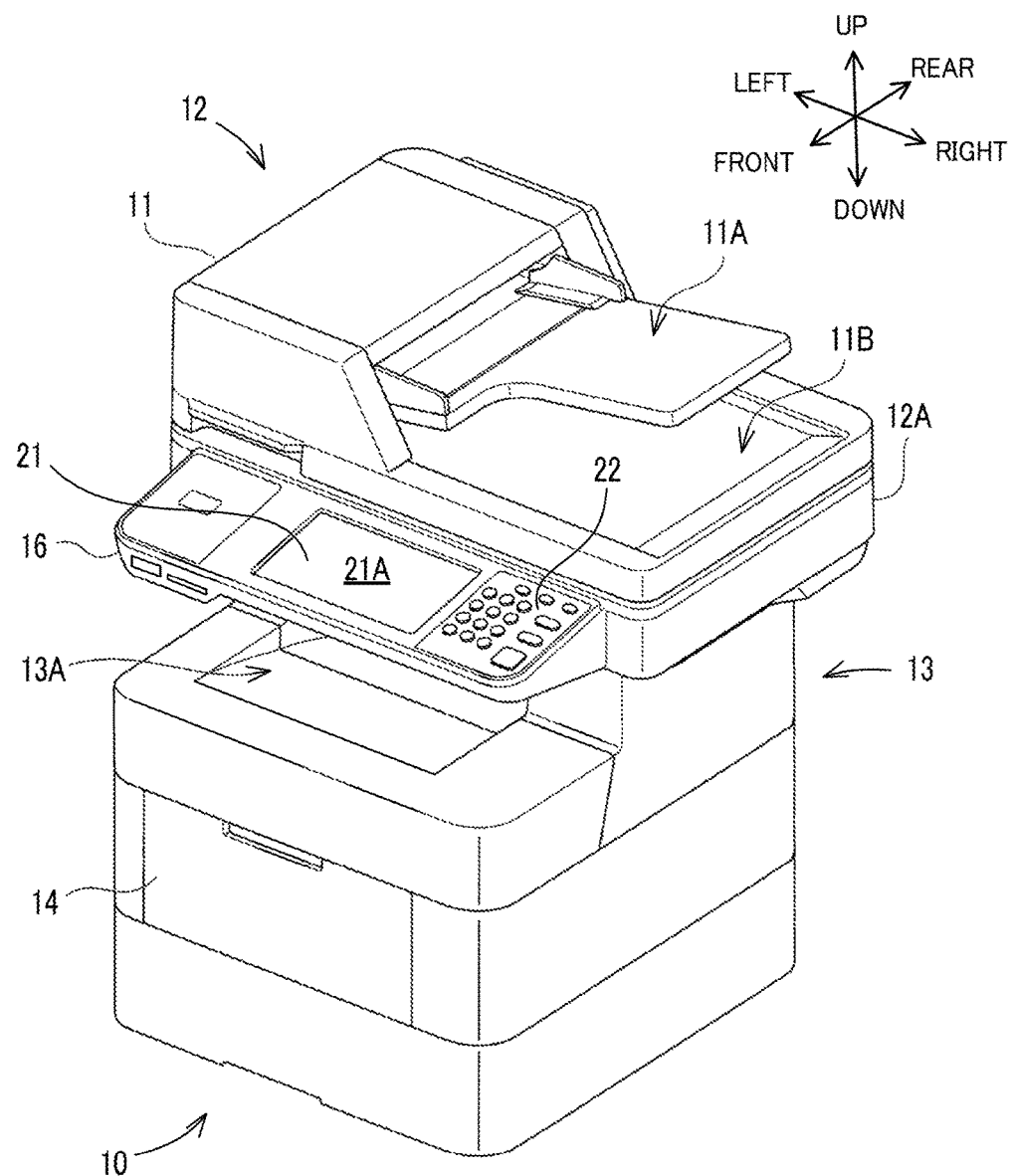
FIG. 1 is a perspective diagram showing an image processing apparatus according to an embodiment of the present invention.
Figure 2:
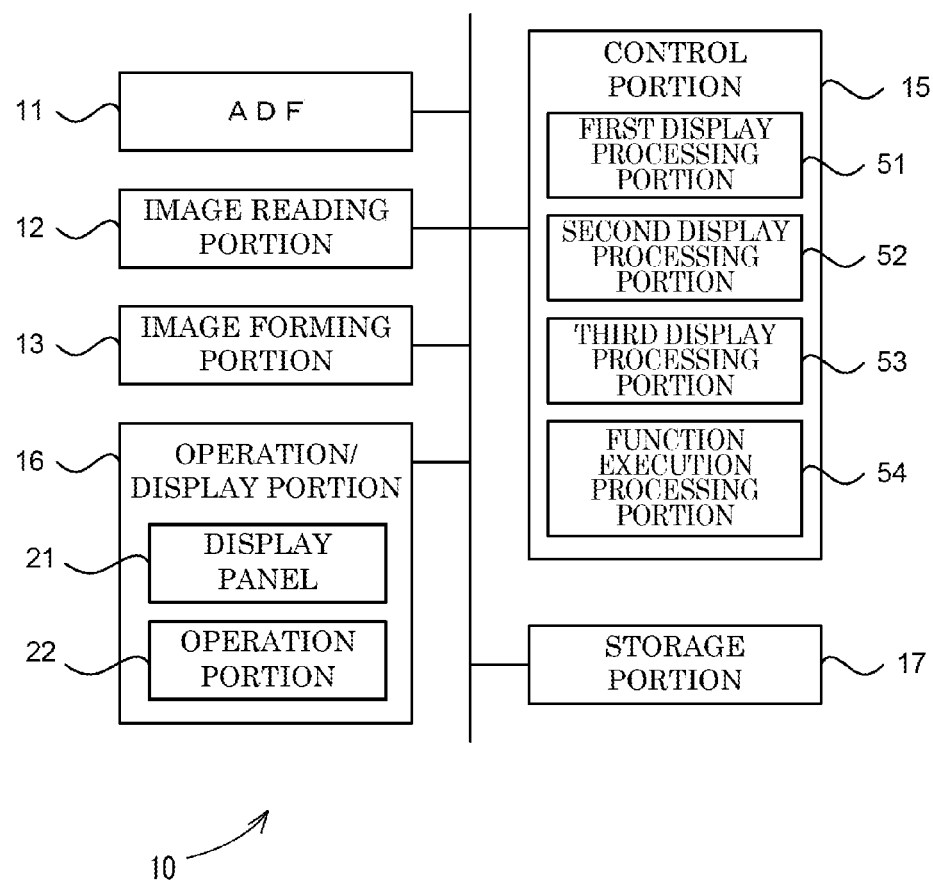
FIG. 2 is a block diagram showing a configuration of the image processing apparatus according to the embodiment of the present invention.

First, an outlined configuration of an image processing apparatus 10 according to an embodiment of the present invention is described with reference to FIG. 1 and FIG. 2. Here, FIG. 1 is a schematic cross-sectional diagram showing a configuration of the image processing apparatus 10. FIG. 2 is a block diagram showing a configuration of the image processing apparatus 10.

The image processing apparatus 10 is a multifunction peripheral having a plurality of major functions such as a copy function to print an image read from a document sheet, a scan function to read and store image data of the document sheet, a data transmission function to transmit the read image data, a print function to form an image based on image data that has been externally input, and a facsimile function to transmit image data by facsimile. It is noted that the present invention is applicable to image processing apparatuses that include, for example, a scanner apparatus (image reading apparatus), a printer apparatus (image forming apparatus), a facsimile apparatus, and a copy apparatus (image forming apparatus).

Specifically, as shown in FIG. 1 and FIG. 2, the image processing apparatus 10 includes an ADF (automatic document feeder) 11, an image reading portion 12, an image forming portion 13, a sheet feed portion 14, a control portion 15, an operation/display portion 16, and a storage portion 17 (an example of the storage medium of the present invention).

The ADF 11 includes a document sheet setting portion 11A, a plurality of conveyance rollers, a document sheet pressing, and a sheet discharge portion 11B, and conveys a document sheet that is read by the image reading portion 12.

The image reading portion 12 includes a document sheet table 12A, a light source, a plurality of mirrors, an optical lens, and a CCD, and is configured to read image data from the document sheet. In addition, the image reading portion 12 is configured to store the read image data onto an external memory such as a USB memory or a SD card connected to the operation/display portion 16. When a reading start instruction is input from the operation/display portion 16, the image reading portion 12 starts a document sheet reading operation to read image data from the document sheet.

The image forming portion 13 performs a process to form an image by the electrophotographic system based on image data read by the image reading portion 12 or based on image data input from an external information processing apparatus. Specifically, the image forming portion 13 includes a photoconductor drum, a charging device, a laser scanning device, a developing device, a transfer roller, a cleaning device, a fixing roller, a pressure roller, and a sheet discharge portion 13A. In the image forming portion 13, an image is formed on a sheet that is supplied from the sheet feed portion 14, and the sheet with the image formed thereon is discharged to the sheet discharge portion 13A. In addition, the image forming portion 13 can also perform a so-called direct print in which a monochrome image or a color image is formed based on image data or document sheet data that has been directly read from a USB memory or a SD card connected to the operation/display portion 16. When a copy start instruction is input from the operation/display portion 16, image data is read from a document sheet, and then an image forming operation is performed.

The operation/display portion 16 is provided in front of the image reading portion 12. The operation/display portion 16 includes a display panel 21 and an operation portion 22.

The display panel 21 is provided on an upper surface of the operation/display portion 16. A display surface 21A of the display panel 21 is arranged such that the user can visually recognize it from outside. The display panel 21 is a liquid crystal display on which information regarding printing is displayed, wherein the information includes: a plurality of key images used for inputting, setting, instructing and the like; a preview image of image data or document sheet data to be printed; and a message indicating a print state, a print setting or the like. In the present embodiment, an initial screen 30 shown in FIG. 4A, and a command input screen 40 shown in FIG. 4B (an example of the selection screen of the present invention) are displayed on the display surface 21A of the display panel 21, wherein the command input screen 40 is described below.

The display panel 21 is a touch panel configured to detect an input that is made by an external contact, and accept an input to a displayed key image or the like when the user touches and contacts his/her finger on the display surface 21A of the display panel 21.

On the operation portion 22, input keys are arranged, wherein the input keys include numeral keys used to input numerals from 0 (zero) to 9 (nine) or the like, a start button for starting a print operation, a software program or the like, and a stop button for stopping the print operation or the like.

The storage portion 17 is a nonvolatile storage device. For example, the storage portion 17 is a storage device such as a flash memory, a SSD (solid state drive), or a HDD (hard disk drive).

The storage portion 17 stores a plurality of pieces of functional information that belong to the above-described major functions provided in the image processing apparatus 10 (the copy function, the scan function, the data transmission function, the print function, the facsimile function, and the like). The plurality of pieces of functional information are used in a command executing process that is described below.

The plurality of pieces of functional information indicate high-order items and low-order items, wherein the high-order items are a lot of setting items and execution items and the like that belong to the major functions, and the low-order items belong to the high-order items. Specific examples of the high-order items are setting items for a copy setting, a scan setting, a data transmission setting, a print setting, a facsimile setting, and the like. Other examples of the high-order items are, for example, execution items for executing a deletion of image data, a batch deletion of setting items, and the like. In addition, further examples of the high-order items are acquisition items for acquiring IP information registered in the image processing apparatus 10, firmware version information of the image processing apparatus 10, a serial number of the image processing apparatus 10, and the like.

Specific examples of the low-order items are detailed setting items that belong to copy setting items, that are, for example, setting items for setting the number of copies, setting the print sheet, setting color or monochrome, setting print resolution, and the like. Other examples of the low-order items are detailed setting items that belong to scan setting items (for setting color or monochrome, setting reading resolution and the like), detailed setting items that belong to data transmission setting items (for setting the transmission destination, the transmission speed, the communication and the like), detailed setting items that belong to print setting items (for setting the number of print copies, the print sheet, color or monochrome, the print resolution, and the like), and detailed setting items that belong to facsimile setting items (for setting the destination, the transmission speed and the like).

In the present embodiment, a plurality of pieces of functional information corresponding to the above-described setting items are organized in hierarchical layers and stored in the storage portion 17. Specifically, groups of functional information corresponding to the high-order items are stored in a high-order layer, and groups of functional information corresponding to the low-order items are stored in association with the high-order items, in a low-order layer.

In addition, the storage portion 17 stores various types of data that are used in the command executing process that is described below. For example, the storage portion 17 stores a GUI file for executing a display process of the command input screen 40 (see FIG. 4B), and use frequency of the commands that were selected in the past on the command input screen 40. Here, the commands refer to indication instructions that specify items (setting items, execution items, acquisition items and the like) that correspond to the plurality of pieces of functional information. In the present embodiment, a plurality of commands are assigned in correspondence with the plurality of pieces of functional information. For example, a command "@Set" is assigned in correspondence with a setting item. In addition, a command "@Action" is assigned in correspondence with an execution item. In addition, a command "@Get" is assigned in correspondence with an acquisition item. In the following description, commands (@Set, @Action, @Get and the like) corresponding to the functional information belonging to the high-order layer (the above-described high-order items) are referred to as high-order commands, and commands corresponding to the functional information belonging to the low-order layer (the above-described low-order items) are referred to as low-order commands.

Specific examples of the low-order commands are commands "IP", "Tray", "Emulation", "PaperSize", "DocSize", "Resolution" and the like that belong to the command "@Set". The command "IP" is an indication instruction for identifying a detailed setting item for setting an IP address in the image processing apparatus 10. The command "Tray" is an indication instruction for identifying a detailed setting item for setting a tray in which sheets used for the printing are stored. The command "Emulation" is an indication instruction for identifying a detailed setting item for setting an operation mode (a draft printing mode or the like) used in the printing, or an operation mode (an energy saving mode or the like) in the image processing apparatus 10. The command "PaperSize" is an indication instruction for identifying a detailed setting item for setting a paper size used in the copying or printing. The command "DocSize" is an indication instruction for identifying a detailed setting item for setting the size of a document sheet used in the scanning. The command "Resolution" is an indication instruction for identifying a detailed setting item for setting a resolution applied to the copying, printing, or scanning.

The high-order commands and the low-order commands are not limited to the above-described ones. Commands may be assigned in correspondence with other functional information (high-order items and low-order items). The storage portion 17 stores, in advance, assignment relationship between the commands and the plurality of pieces of functional information.

The control portion 15 includes control equipment such as a CPU, a ROM, and a RAM. The CPU is a processor that executes various calculation processes. The ROM is a nonvolatile storage portion in which various information such as control programs for causing the CPU to execute various processes are stored in advance. The RAM is a volatile storage device and is used as a temporary storage memory (working area) for the various processes executed by the CPU. The control portion 15 is connected to the ADF 11, the image reading portion 12, the image forming portion 13, the operation/display portion 16, and the storage portion 17.

In the control portion 15, the CPU executes the various control programs that are stored in advance in the ROM. This allows the image processing apparatus 10 to be comprehensively controlled by the control portion 15. In particular, the control portion 15 executes the command executing process described below and receives a plurality of commands input from the command input screen 40 described below, retrieves a specific piece of functional information that is common to the plurality of commands, and executes a specific function corresponding to the specific piece of functional information. It is noted that the control portion 15 may be composed of an electronic circuit such as an integrated circuit (ASIC). In addition, the control portion 15 may be a control portion that is provided in the operation/display portion 16, independently of a main control portion that comprehensively controls the image processing apparatus 10.

When the CPU executes the control programs, the control portion 15 operates as a first display processing portion 51, a second display processing portion 52, a third display processing portion 53, and a function execution processing portion 54.

The third display processing portion 53 performs a process of displaying the command input screen 40 that includes a first display frame 41 and a second display frame 42 when the user touch-operates a short-cut key 31 displayed on the initial screen 30.

Figure 4A:
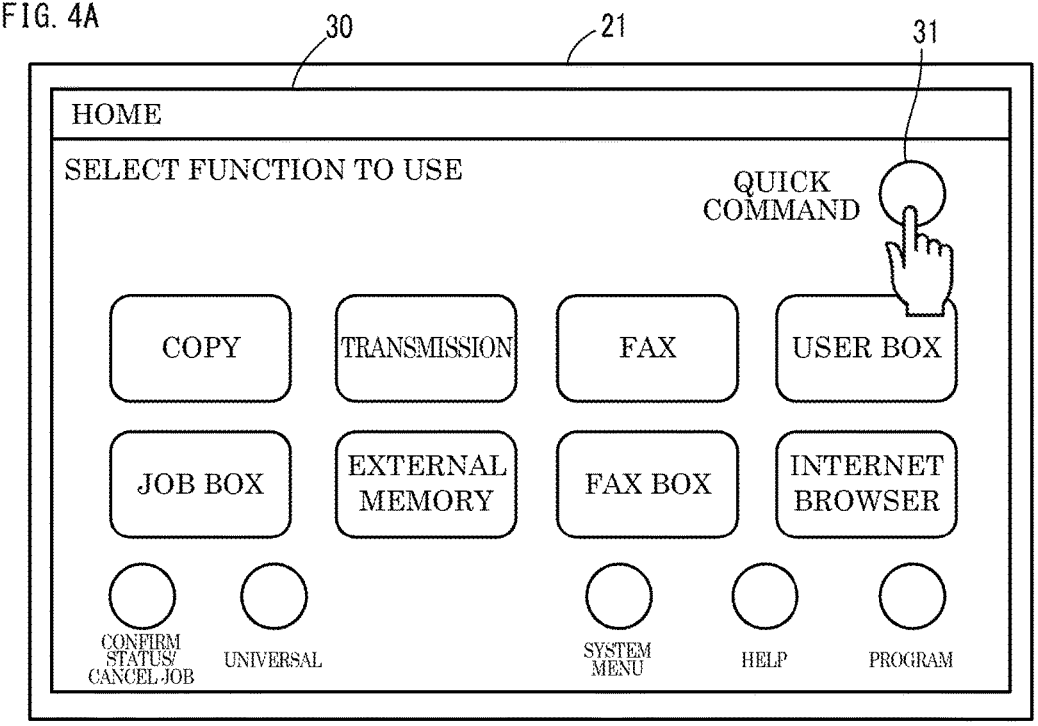
FIG. 4A is a screen diagram showing an example of an initial screen displayed on a display panel.

Here, the initial screen 30 is displayed on the display panel 21 immediately after the image processing apparatus 10 is activated, or immediately after the user logs in the image processing apparatus 10. FIG. 4A shows an example of the initial screen 30. A plurality of icon images that represent the major functions provided in the image processing apparatus 10 are arranged on the initial screen 30. When an icon image is touch-operated, the control portion 15 displays, on the display panel 21, a menu screen showing setting items and execution items of a major function corresponding to the icon image. It is noted that icon images corresponding to a system menu and the like are also arranged on the initial screen 30, and when one of these icon images is touch-operated, a menu screen showing functions (for example, a system setting item) corresponding to the icon image is displayced on the display panel 21.

Figure 4B:
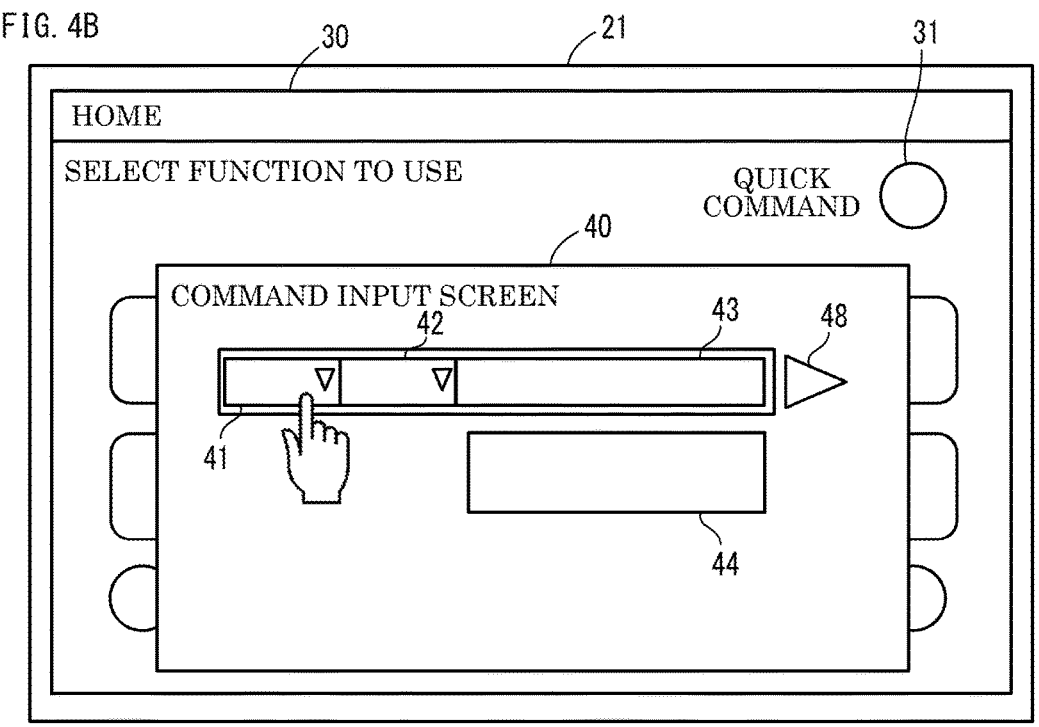
FIG. 4B is a screen diagram showing an example of a command input screen displayed on the display panel.

In addition, the short-cut key 31 for command input is arranged on the initial screen 30 at a position that can be touch-operated by the user. In the present embodiment, in addition to the icon images of the major functions, one short-cut key 31 is included in the initial screen 30. When the short-cut key 31 is touch-operated by the user, the third display processing portion 53 activates the GUI file stored in the storage portion 17 such that the command input screen 40 shown in FIG. 4B is displayed on the display panel 21. It is noted that instead of the short-cut key 31, a hard key having the same function as the short-cut key 31 may be provided in the operation portion 22.

As shown in FIG. 4B, the command input screen 40 includes the first display frame 41 and the second display frame 42, wherein the first display frame 41 displays high-order commands and the second display frame 42 displays low-order commands. In the command input screen 40, the second display frame 42 is disposed adjacent to the first display frame 41. Specifically, in the command input screen 40, the first display frame 41 is disposed at the leftmost position and the second display frame 42 is disposed immediately on the right side of the first display frame 41 so that the selection order can be recognized at a glance. It is noted that the first display frame 41 and the second display frame 42 may be disposed in alignment in the up-down direction, the first display frame 41 being disposed at an upper position, the second display frame 42 being disposed below the first display frame 41. With the command input screen 40 displayed on the display panel 21, the first display frame 41 and the second display frame 42 are assigned to a display surface 21B of the display panel 21. The first display frame 41 is caused to display the high-order commands by the first display processing portion 51 described below, and the second display frame 42 is caused to display the low-order commands by the second display processing portion 52 described below.

It is noted that in the command input screen 40, a third display frame 43 is disposed on the right side of the second display frame 42. When there are further low-order commands under the low-order command selected in the second display frame 42, the third display frame 43 functions as a display frame in which the low-order commands are displayed in a selectable manner. In addition, when the low-order command selected in the second display frame 42 is a command that is used to change a setting or make a new setting, the third display frame 43 functions as an input field in which a predetermined setting can be input.

The first display processing portion 51 displays, in the first display frame 41 of the command input screen 40, the plurality of high-order commands corresponding to the plurality of pieces of functional information (high-order items), in a selectable manner. As the method for displaying the commands in a selectable manner, the pull-down method, for example, can be applied so that the plurality of high-order commands are displayed in a column. As shown in FIG. 4B, when the first display frame 41 is touch-operated by the user, the first display processing portion 51 displays a list of the plurality of high-order commands in a pull-down menu 41A as shown in FIG. 5A. In the example shown in FIG. 5A, the high-order commands are displayed in an order of the command "@Set", the command "@Get", the command "@Action", . . . . Subsequently, when a specific one of the high-order commands is touch-operated on the pull-down menu 41A of the first display frame 41, the touch-operated high-order command is selected and displayed in the first display frame 41 (see FIG. 5B). It is noted that FIG. 5B shows an example in which the command "@Set" is touch-operated and displayed in the first display frame 41.

Figure 7:
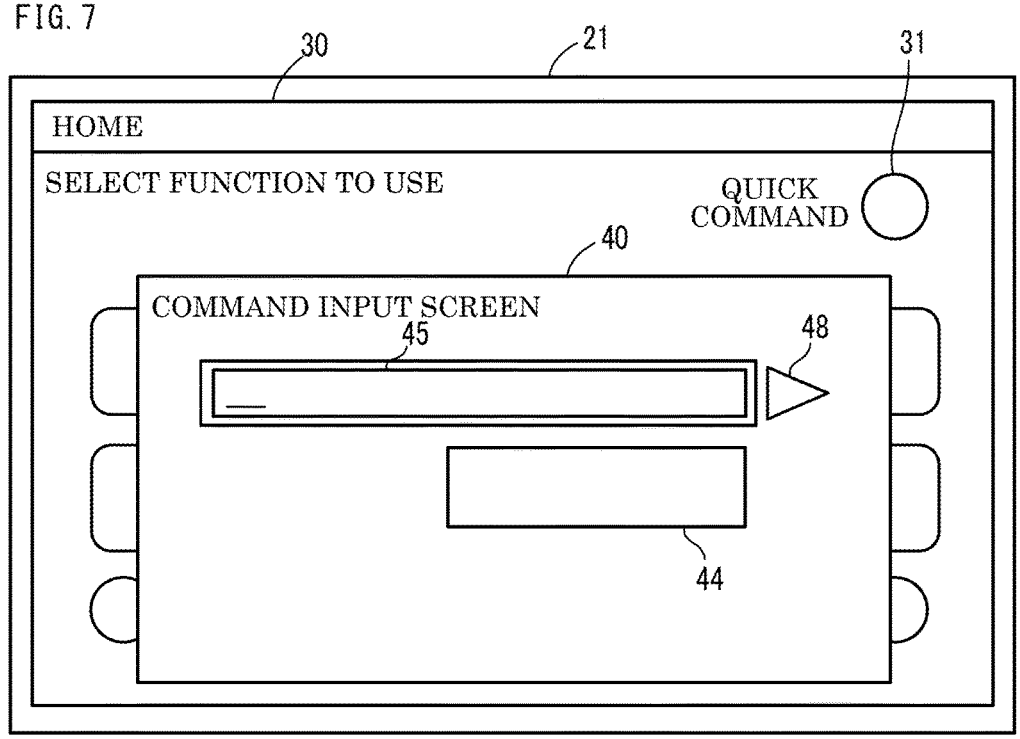
FIG. 7 is a screen diagram showing another example of the command input screen displayed on the display panel.

The first display processing portion 51 displays a command "manual" in the pull-down menu 41A of the first display frame 41, together with the high-order commands. The command "manual" allows the user to input a command manually. For example, when the command "manual" has been selected in the first display frame 41, the control portion 15 changes the display frames (the first display frame 41 to the third display frame 43) of the command input screen 40 to a manual input frame 45 (see FIG. 7) so that a manual input can be accepted. It is noted that a command can be input to the manual input frame 45 via input keys (not shown) provided in the operation portion 22.

Figure 6A:
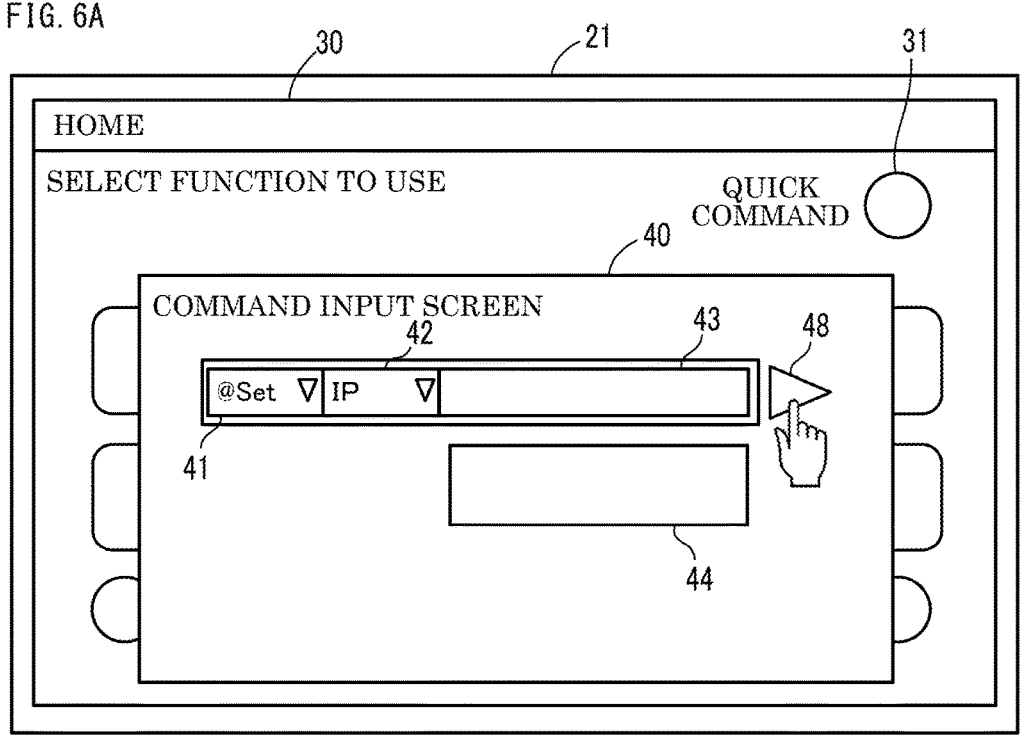
FIG. 6A is a screen diagram showing a display example of a command displayed on the command input screen.

When one of the high-order commands has been selected in the first display frame 41, the second display processing portion 52 displays low-order commands that belong to the selected high-order command, in the second display frame 42 in a selectable manner. The low-order commands displayed in the second display frame 42 belong to the high-order command selected in the first display frame 41, and specifically are commands that correspond to a plurality of low-order items that belong to a high-order item (functional information) corresponding to the high-order command. As the method for displaying the commands in a selectable manner, as is the case with the display method of the first display frame 41, the pull-down method can be applied so that the plurality of low-order commands are displayed in a column. As shown in FIG. 5A, when the second display frame 42 is touch-operated by the user, the second display processing portion 52 displays a list of the plurality of high-order commands in a pull-down menu 42A as shown in FIG. 5B. In the example shown in FIG. 5B, the low-order commands of the command "@Set" are displayed in an order of the command "IP", the command "Tray", the command "Emulation", the command "PaperSize", the command "DocSize", the command "Resolution", . . . "More". Subsequently, when a specific one of the low-order commands is touch-operated on the pull-down menu 42A of the second display frame 42, the touch-operated low-order command is selected and displayed in the second display frame 42 (see FIG. 6A). It is noted that FIG. 6A shows an example in which the command "IP" is touch-operated and displayed in the second display frame 42. It is noted that when "More" has been selected in the second display frame 42, the display content of the pull-down menu 42A is updated, and other low-order commands are displayed.

In the present embodiment, when a high-order command has been selected in the first display frame 41, the second display processing portion 52 displays the low-order commands corresponding to the high-order command in the second display frame 42 in an order according to the selection frequencies of the low-order commands. Specifically, each time a low-order command is selected in the second display frame 42, the control portion 15 measures the selection frequency of the low-order command and stores the selection frequency in the storage portion 17. Subsequently, when the second display frame 42 is touch-operated by the user, the control portion 15 reads the selection frequencies from the storage portion 17, rearranges the low-order commands according to the selection frequencies, and displays the pull-down menu 42A containing a list of the rearranged low-order commands. In the example of FIG. 5B, a list of commands having been rearranged in accordance with the selection frequencies is displayed.

It is noted that when a high-order command is selected in the first display frame 41, a low-order command having the highest selection frequency may be displayed in the second display frame 42. For example, when the command "@Set" is selected in the first display frame 41, the command "IP" that is a low-order command having the highest selection frequency among the plurality of low-order commands displayed in the pull-down menu 42A may be displayed in the second display frame 42.

Figure 6B:
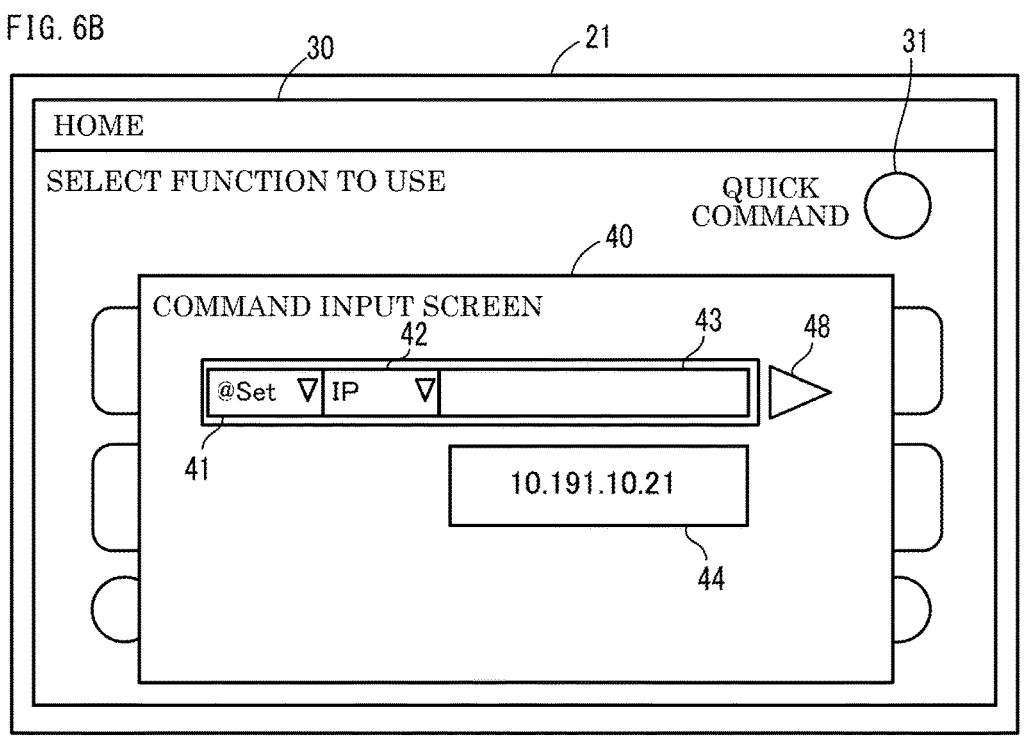
FIG. 6B is a screen diagram showing a display example of a command displayed on the command input screen.

When a high-order command is selected (displayed) in the first display frame 41, and a low-order command is selected (displayed) in the second display frame 42, the function execution processing portion 54 executes a function corresponding to a specific piece of functional information that is common to the commands selected in the first display frame 41 and the second display frame 42. Specifically, the command input screen 40 includes an execution key 48 that is touch-operated to execute a function. When the execution key 48 is touch-operated by the user as shown in FIG. 6A, the function execution processing portion 54 searches the storage portion 17 for a piece of functional information that is common to the first display frame 41 and the second display frame 42, selects the piece of functional information, and executes a function that corresponds to the selected piece of functional information. For example, as shown in FIG. 6A, when the execution key 48 is touch-operated in a state where the command "@Set" is displayed in the first display frame 41 and the command "IP" is displayed in the second display frame 42, an IP address is selected as a piece of functional information that is common to the command "@Set" and the command "IP", and the IP address registered in the image processing apparatus 10 is displayed in a fourth display frame 44 that is provided outside the third display frame 43 (see FIG. 6B).

Figure 3:
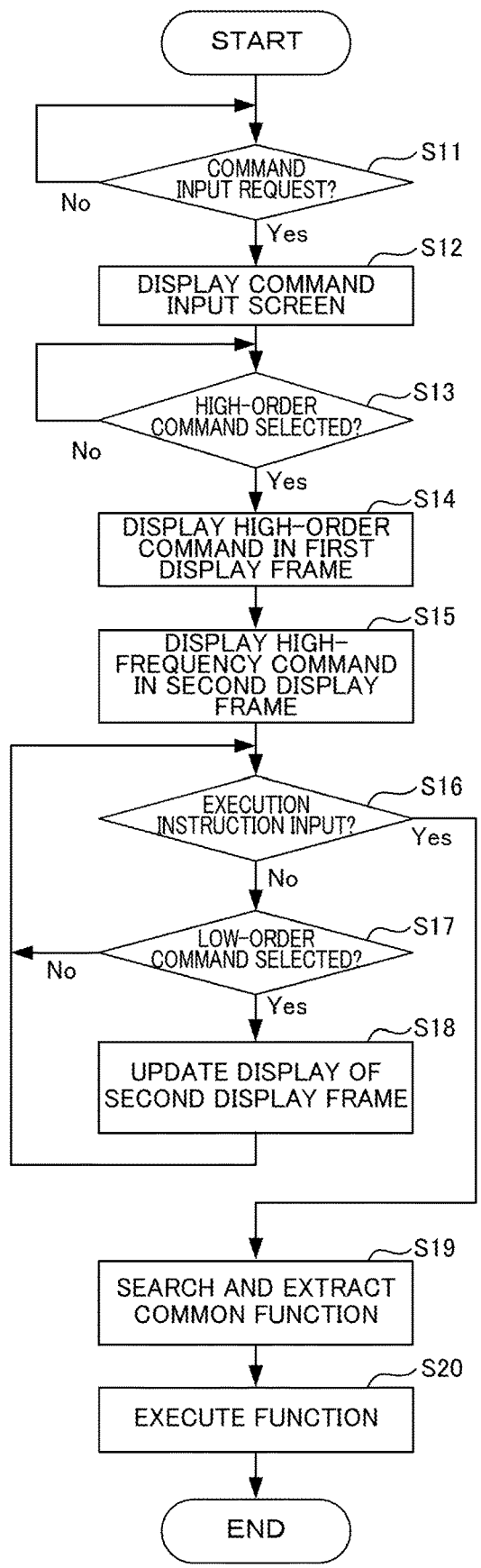
FIG. 3 is a flowchart showing a procedure of a command executing process executed in the image processing apparatus according to the embodiment of the present invention.

In the following, the procedure of a function executing process executed by the control portion 15 is described. In the flowchart of FIG. 3, steps S11, S12, . . . represent processing procedures (step numbers). The function executing process is executed when the initial screen 30 is displayed on the display panel 21 after the user logs in the image processing apparatus 10.

Upon detection of a user ID and a password that have been input by the user on the log-in screen displayed on the display panel 21, the control portion 15 determines whether or not to permit a log-in of the user based on personal information of a registered user stored in the storage portion 17. Subsequently, upon permitting the user to log in, the control portion 15 displays the initial screen 30 (see FIG. 4A) on the display panel 21.

In step S11, it is determined whether or not a command input request has been input on the initial screen 30. Specifically, it is determined whether or not the short-cut key 31 has been touch-operated on the initial screen 30. When the user touch-operates the short-cut key 31, the control portion 15 determines that the short-cut key 31 has been touch-operated, namely, a command input request has been input, by detecting a voltage signal that was generated by the touch operation.

When, in step S11, it is determined that a command input request has been input, the control portion 15 displays the command input screen 40 (see FIG. 4B) on the display panel 21.

In the next step S13, the control portion 15 determines whether or not a high-order command has been selected from the pull-down menu 41A of the first display frame 41 by the user by a touch operation. Upon determining that a high-order command has been selected from the pull-down menu 41A (see FIG. 5A) of the first display frame 41, the control portion 15, in step S14, displays the selected high-order command in the first display frame 41 (see FIG. 5B).

In the next step S15, the control portion 15 refers to the selection frequencies stored in the storage portion 17, and displays, in the second display frame 42, a low-order command that has the highest selection frequency. The selection frequency used at this time is preferably a selection frequency of a low-order command that was selected in the past by the user currently logging in. With this configuration where a low-order command identified by such a selection frequency is displayed in the second display frame 42, the user does not need to carry out a selection action, and thus it is possible to exclude the selection action of the user, and improve the operability of the user. It is noted that in a case where a selection frequency of an individual user has not reached a certain number of uses, using the selection frequency may rather decrease the operability. As a result, in a case where a selection frequency of an individual user has not reached a certain number of uses, the control portion 15 may refer to selection frequencies of all users registered in the image processing apparatus 10, and display a low-order command having the highest selection frequency in the second display frame 42.

In the next step S16, the control portion 15 determines whether or not an execution instruction has been input. The control portion 15 determines that an execution instruction has been input when the execution key 48 of the command input screen 40 has been touch-operated by the user. Upon determining that an execution instruction has not been input, the process proceeds to step S17.

In the next step S17, the control portion 15 determines whether or not a low-order command has been selected from the pull-down menu 42A of the second display frame 42 by the user by a touch operation. Upon determining that a low-order command has been selected from the pull-down menu 42A (see FIG. 5B) of the second display frame 42, the control portion 15 in step S18 updates the display content of the second display frame 42 to the selected low-order command. It is noted that when it is determined in step S16 that an execution instruction has been input, the process proceeds to step S19.

In step S19, in a state where a high-order command is selected in the first display frame 41, and a low-order command is selected in the second display frame 42, the storage portion 17 is searched for a specific piece of functional information that is common to the commands selected in the first display frame 41 and the second display frame 42. Thereafter, the control portion 15 executes a function that corresponds to the piece of functional information selected by the search (S20). For example, as shown in FIG. 6A, when the execution key 48 is touch-operated in a state where the command "@Set" is selected (input) in the first display frame 41 and the command "IP" is selected (input) in the second display frame 42, it means that a command instructing to "acquire and display an IP address registered in the image processing apparatus 10" is input, and a process (function) to display the IP address registered in the image processing apparatus 10 in the fourth display frame 44 is executed.

As described above, in the image processing apparatus 10, the user only have to select commands in the first display frame 41 and the second display frame 42 to set the commands that the user desires, and the user only have to touch-operate the execution key 48 to execute the functions corresponding to the commands. As a result, the user can select and set desired functions from a lot of detailed functions provided by the major functions, and execute the functions.

It is noted that according to an example case provided in the above-described embodiment, the selection frequencies are referred to and a low-order command is displayed automatically in the second display frame 42. However, the control portion 15 may not use the selection frequencies, but may display, in the second display frame 42, a low-order command that was selected from the second display frame 42 by a selection action carried out to the second display frame 42. In addition, in the above-described embodiment, the selection frequency is used only for the second display frame 42 such that a high-frequency low-order command is automatically displayed therein. However, the selection frequency may be used for a high-order command displayed in the first display frame 41 as well such that a high-frequency high-order command is automatically displayed therein.

According to an example case provided in the above-described embodiment, the command input screen 40 is displayed when the short-cut key 31 is touch-operated in a state where the initial screen 30 is displayed. However, the present invention is not limited to the example case. In the above-described embodiment, when two operations, namely a touch operation to the shortcut key 31 and a selection operation to the first display frame 41, are performed, a high-order command desired by the user is displayed in the first display frame 41. However, for example, the command input screen 40 may be displayed when the shortcut key 31 is touched a predetermined number of times on the initial screen 30, and a high-order command according to the number of touches may be displayed in the first display frame 41. Of course, the number of touches may be replaced with a time period of touch, and when the shortcut key 31 is touched for a predetermined time period on the initial screen 30, the command input screen 40 may be displayed, and a high-order command according to the time period of touch may be displayed in the first display frame 41. It is noted that the control portion 15 references a correspondence table between the high-order commands and the number of touches or the time period of touch that is stored in the storage portion 17 in advance, and displays a corresponding high-order command in the first display frame 41.

The invention claimed is:

1. An image processing apparatus comprising:
   a display panel;
   a storage medium storing a plurality of pieces of functional information organized in hierarchical layers;
   a first display processing portion configured to display, in a selectable manner, high-order commands in a first display frame assigned to the display panel, the high-order commands corresponding to a plurality of pieces of functional information that belong to a high-order layer;
   a second display processing portion configured to, when a high-order command has been selected from the high-order commands in the first display frame, display, in a selectable manner, low-order commands in a second display frame assigned to the display panel, the low-order commands corresponding to a plurality of pieces of functional information that are included in a low-order layer that belongs to the high-order command;
   a function execution processing portion configured to, when the high-order command has been selected in the first display frame and a low-order command has been selected in the second display frame, execute a function corresponding to a specific piece of functional information that is common to the high-order command selected in the first display frame and the low-order command selected in the second display frame; and
   a display frame change control portion configured to, upon selection of a manual command in the first display frame, combine the first display frame and the second display frame into a manual input frame that accepts a manual input of one of a plurality of commands corresponding to the plurality of pieces of functional information, wherein
   the first display processing portion displays, in a selectable manner, the manual command in the first display frame together with the high-order commands, the manual command enabling the manual input of one of the plurality of commands corresponding to the plurality of pieces of functional information.

2. The image processing apparatus according to claim 1, wherein
   when the high-order command has been selected in the first display frame, the second display processing portion displays the low-order commands corresponding to the high-order command in the second display frame in an order according to selection frequencies of the low-order commands.

3. The image processing apparatus according to claim 2, wherein
   when the high-order command has been selected in the first display frame, the second display processing portion displays a low-order command having a highest selection frequency in the second display frame.

4. The image processing apparatus according to claim 1, wherein
   the first display processing portion and the second display processing portion each display commands in a column by a pull-down method.

5. The image processing apparatus according to claim 1, further comprising:
   a third display processing portion configured to, when a short-cut key displayed on the display panel has been selected, display a selection screen that includes the first display frame and the second display frame.

* * * * *